May 20, 1958    M. F. KEATHLEY, SR., ET AL    2,835,212
SHEETING APPARATUS FOR PLASTIC MATERIAL

Filed May 21, 1956      2 Sheets-Sheet 1

INVENTORS,
MAURICE F. KEATHLEY, SR.
ROBERT O. MANSPEAKER
BY
Weatherford & Weatherford
Attys

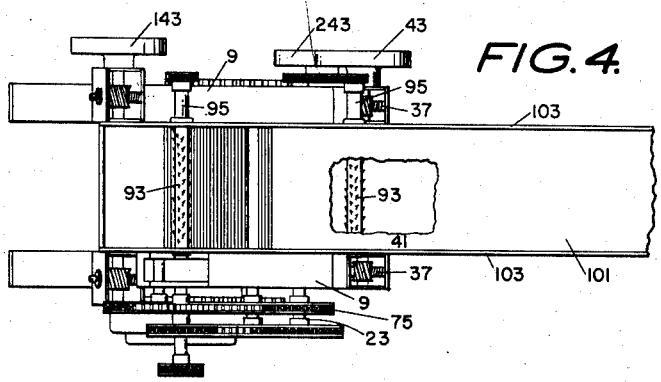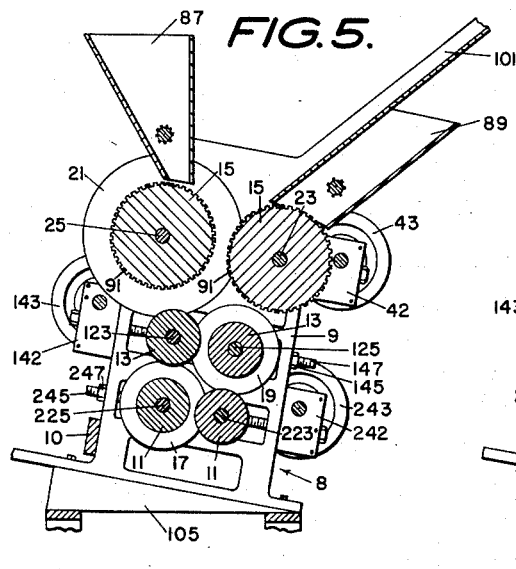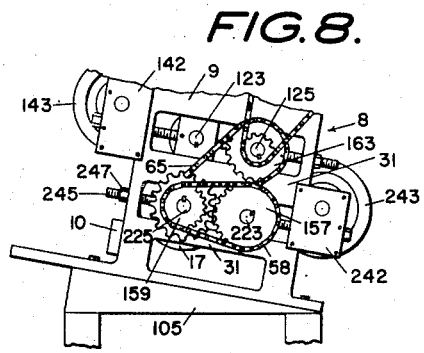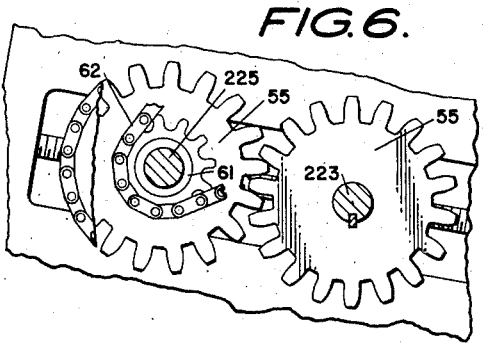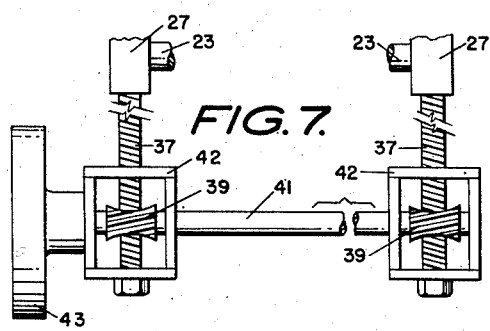

United States Patent Office 2,835,212
Patented May 20, 1958

2,835,212

SHEETING APPARATUS FOR PLASTIC MATERIAL

Maurice F. Keathley, Sr., and Robert O. Manspeaker, Memphis, Tenn.

Application May 21, 1956, Serial No. 586,019

6 Claims. (Cl. 107—12)

This invention relates to improvements in apparatus for sheeting plastic material and the like. In particular, it relates to sheeting apparatus of the type employing sets of rollers which compress plastic material from a thick mass of material down to a relatively thin sheet of material.

Heretofore in sheeting apparatus of this type there has been the constant problem of insuring a uniform sheet of material free from tears. This problem has been particularly prevalent in the sheeting of dough for use in pies, pastries, and the like. Therefore, in the present specification and drawings a dough sheeter is referred to and is illustrated, but it should be understood that the invention is not limited to the sheeting of dough and the structure herein disclosed may be used to sheet other types of plastic materials as well.

The present invention is directed towards overcoming the above-mentioned problem by providing apparatus in which the rollers thereof are so arranged in the proper sizes, speeds, and proper relationship that a high degree of uniformity of sheeting material which is free from tears is obtained.

The principal object of the present invention is to provide a novel sheeting apparatus so constructed that a uniform sheeting of material free from tears may be produced by the apparatus.

A further object of the present invention is to provide such a sheeting apparatus having laterally spaced pairs of rollers arranged in a bank, one of each of the pairs being provided with flanges which overlap the other roller in the pair, and the flanged rollers of one pair being in diagonal relationship with the flanged rollers of the adjacent overlying or underlying pair, whereby the rollers may be closely spaced both laterally and vertically.

A further object is to provide such a sheeting apparatus having an upper pair of rollers, an intermediate pair of rollers, and a lower pair of rollers. The diameters of the lower and intermediate rollers being substantially the same, and the diameter of the upper pair being substantially twice the diameter of the intermediate pair.

A further object is to provide such a sheeting apparatus having said upper, intermediate, and lower pair of rollers in which the speed of the intermediate pair is substantially twice the speed of the lower pair, and the speed of the upper pair is substantially three times the speed of the intermediate pair.

A further object is to provide such a sheeting apparatus having pairs of rollers, one of each pair having rapid adjustment means to vary the spacing between the pairs of rollers.

A further object is to provide means for varying the speed of the pairs of rollers.

A further object is generally to improve the design and construction of sheeting apparatus.

The means by which the foregoing and other objects of the present invention are accomplished and the manner of their accomplishment will be readily understood from the following specification upon reference to the accompanying drawings, in which:

Fig. 4 is a top plan view of the same.

Fig. 5 is a sectional view taken as on line V—V of Fig. 3.

Fig. 6 is an enlarged fragmentary view of a portion of the gears as viewed in Fig. 1, with gears removed and broken away for purposes of illustration.

Fig. 7 is an enlarged fragmentary top plan view of one of the roller adjustment means.

Fig. 8 is a fragmentary side elevational view similar to Fig. 1 showing gears of different diameters than those of Fig. 1 whereby a variation in the speed of the rollers may be accomplished.

Figure 1:
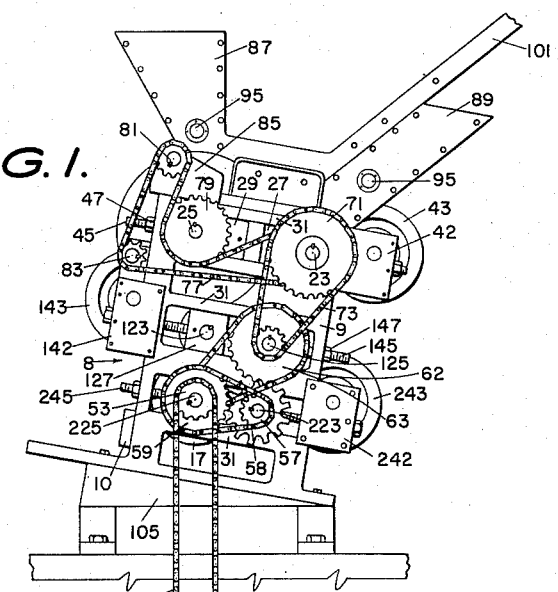
Fig. 1 is a side elevational view of the apparatus of the present invention.

Referring now to the drawings in which the various parts are indicated by numerals, the sheeting apparatus of the present invention comprises in general a frame 8 in which pairs of laterally spaced rollers are arranged in a vertical bank. Frame 8 preferably comprises sides 9 and an end brace 10.

In the present drawings the number of pairs of rollers are herein illustrated as three, although it will be understood that if desired more pairs of rollers may be provided. Thus, in the present drawings a lower pair of laterally spaced rollers 11, an intermediate pair of laterally spaced rollers 13, and an upper pair of laterally spaced rollers 15, are illustrated. The pairs of rollers are arranged so that intermediate rollers 13 are spaced above lower rollers 11, and upper rollers 15 are spaced above intermediate rollers 13, whereby the rollers are positioned for feed of plastic material successively between the pairs from above.

Rollers 11, 13 and 15 are preferably of substantially the same length. Lower rollers 11 and intermediate rollers 13 are preferably substantially the same diameter, and the diameter of each of the upper rollers 15 is preferably substantially twice the diameter of each of the intermediate rollers 13 and each of the lower rollers 11. If additional rollers are added above the three pairs illustrated, the diameter of the added rollers should be progressively larger; that is, the diameter of each of the added pair next adjacent the upper pair of rollers should be substantially twice the diameter of each of the upper pair, the diameter of each of the next pair of added rollers should be twice the diameter of each of the first added pair, and so on.

One of the lower pair of rollers 11 is provided with flanges 17 adjacent the opposite ends thereof. Flanges 17 are of sufficient width so as to overlap the other of the lower pair of rollers and to overlap one of the intermediate pair of rollers 13 which is above the roller having flanges 17. One of the intermediate pair of rollers 13, which is above the lower roller that does not have flanges 17 and diagonally opposite the lower roller that has flanges 17, is similarly provided with flanges 19 adjacent the opposite ends thereof. Flanges 19 are of sufficient width so as to overlap the other of the intermediate pair of rollers and to overlap the lower roller that does not have flanges. One of the upper pair of rollers 15, which is above the intermediate roller that does not have flanges and diagonally opposite the intermediate roller that has flanges 19, is provided with flanges 21 adjacent the opposite ends thereof. Flanges 21 are of sufficient width so as to overlap the other of the upper rollers and may be arranged so as to overlap the one of the intermediate rollers 13 that does not have flanges. By providing the flanges on the rollers as above described it will be understood that the rollers may be closely spaced both vertically and laterally. Also, it will be understood the overlapping relationship of the flanges and rollers prevents the dough or other material which is fed down between the rollers from escaping from the ends thereof.

Each pair of rollers are fixedly mounted on shafts which in turn are respectively journalled adjacent their opposite ends in blocks. One of each of the pair of rollers are mounted from blocks which are semi-fixed. The other roller of the pair is mounted from blocks which may be moved rapidly for quick adjustment of the spacing between the rollers. Thus, upper rollers 11 are respectively fixedly mounted on transversely extending shafts 23, 25, with shaft 23 being journalled adjacent the opposite ends thereof in rapid adjustment blocks 27, and shaft 25 being journalled adjacent the opposite ends thereof in semi-fixed blocks 29.

Blocks 27 are slidably mounted between the upper pair of a series of parallel and vertically spaced guide bars 31 which form part of the sides 9. Rapid adjustment blocks 27 are slidable inwardly towards the middle of the frame 8 and outwardly away from the middle by means of threaded studs 37. Studs 37 are respectively fixed at one end to blocks 27 and extend outwardly through apertures provided in the edges of sides 9. Studs 37 are respectively engaged by worm type gears 39 which are fixedly mounted on a rod 41 that extends transverse of the sheeting apparatus and is journalled adjacent its opposite ends in casings 42, which casings form enclosures for the worm gears and form part of frame 8. A hand wheel 43 is fixedly mounted to rod 41 adjacent one end thereof. From the foregoing it will be understood that turn of hand wheel 43 in one direction will cause worm gears 39 concurrently to move studs 37 inwardly with blocks 27 towards the center of the sheeting apparatus which will carry one of rollers 15 therewith. Conversely, it will be understood that when hand wheel 43 is turned in the opposite direction, said one of rollers 15 will be moved outwardly. Thus, rapid adjustment means is provided which by turn of hand wheel 43 will move one of the rollers 15 to vary the spacing between the rollers. Similarly, semi-fixed blocks 29 are slidably mounted between the upper pair of guide bars 31 by means of threaded studs 45. Threaded studs 45 are respectively fixed at one end to blocks 29 and extend outwardly through apertures provided in the edges of sides 9. Nut means 47 respectively threadedly engage studs 45 to anchor studs 45 with blocks 29 against movement. It will be understood that in the normal operation of the machine the adjustment of the spacing between the rollers may be provided by turning hand wheel 43, although it will be understood in some instances, as in the initial setup of the machine, it may be desirable to vary the position of semi-fixed blocks 29. In a manner similar to the above described mounting of upper rollers 15, the intermediate rollers 15 and lower rollers 11 are mounted to provide adjustability of the spacing between the rollers. Thus, intermediate rollers 13 are respectively fixedly mounted on shafts 123, 125, which are respectively journalled adjacent their opposite ends in rapid adjustment blocks 127 and semi-fixed blocks 129 of similar construction to blocks 27, 29, the blocks 127, 129 being respectively slidably mounted between a pair of guide bars 31. The blocks 127 are adapted to be moved in a manner similar to the above described movement of the upper rollers by a turn of hand wheel 143 which drives a worm and stud arrangement having casings 142 as in the upper set of rollers. Also, a threaded stud 145 and nut means 147 is provided for adjustment of semi-fixed block 129. In a similar manner the lower pair of rollers 11 are mounted for adjustment. Thus, rollers 11 are respectively fixedly mounted on shafts 223, 225, which are respectively rotatably mounted in rapid adjustment block 227 and semi-fixed block 229. Adjustment means is provided similar to that described above for the upper and intermediate pairs of rollers and includes hand wheel 243, casing 242, threaded stud 245, nut means 247, and a worm and stud arrangement.

The sets of rollers are driven so that dough or other plastic material fed into the apparatus from above will be conveyed between the rollers downwardly. Thus, in Fig. 1 the right roller of the upper pair of rollers 15 is driven in a counter-clockwise direction, and the other upper roller is driven in a clockwise direction. The intermediate pair of rollers 13 and lower pair of rollers 11 are driven in direction similar to that above described for upper rollers 15.

It has been found that with the size of rollers heretofore described, that is, with the lower and intermediate rollers being substantially of the same diameter and the upper rollers being substantially twice the diameter thereof, that the speeds are preferably such that intermediate rollers 13 are driven at substantially twice the speed of lower rollers 11 and upper rollers 15 are preferably driven at a speed substantially three times that of the speed of intermediate rollers 13. It may be desirable in some instances to vary this relative speed, in which event it is contemplated that the speed may be varied as by changing the size of the drive gears as will be described hereinafter, or by other speed variable means.

Figure 2:
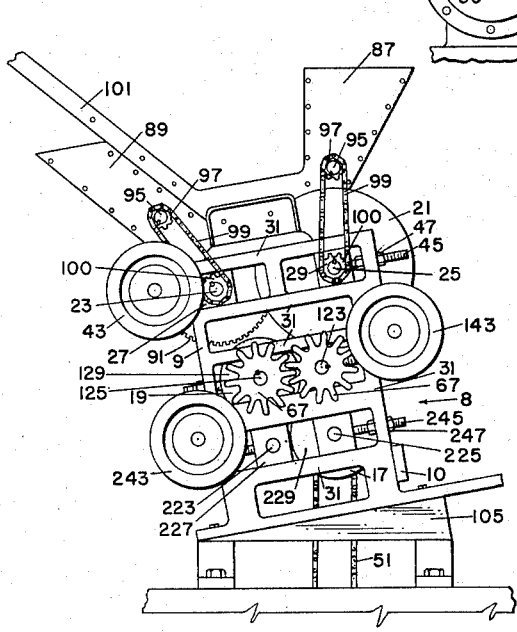
Fig. 2 is a side elevational view of the same as viewed from the opposite side thereof.
Figure 3:
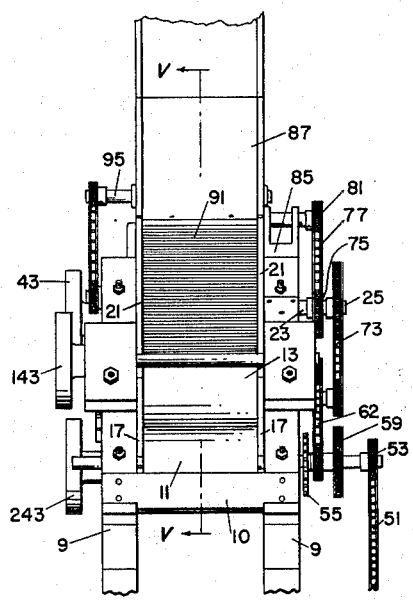
Fig. 3 is an end elevational view thereof.

The rollers 11, 13, 15 may be driven as by means of a motor 49 having a sprocket 50 which drives shaft 225 by means of a chain 51 that links the motor with a sprocket 53 keyed on shaft 225. A pair of drive sprockets 55 preferably of the same diameter and having the same number of teeth are respectively keyed on shafts 223, 225. Sprockets 55 are in mesh and rotation of shaft 225 by motor 49 causes rotation of one of the drive sprockets 55 which drives in the opposite direction the other one mounted on shaft 223. The teeth of drive sprockets 55 are somewhat elongated so that the spacing between the lower pair of rollers 11 may be varied without disengaging sprockets 55 from one another. A sprocket 57 is keyed on shaft 223 and is coupled by means of a chain 58 with a free rotating gear 59 which is rotatably mounted on shaft 225 so that the sprocket 59 may be rotated in the opposite direction from the rotation of shaft 225. A sprocket 61 is fixedly mounted to free rotating sprocket 59. Sprocket 61 is coupled by means of a chain 62 to a sprocket 63 fixedly mounted on shaft 125 whereby means is provided for driving the intermediate roller on shaft 125. As is best illustrated in Fig. 2, a pair of drive gears 67 preferably of the same diameter and having the same number of teeth are fixedly respectively mounted on shafts 123, 125. Gears 67 are provided with somewhat elongated teeth whereby the gears will be in mesh as the spacing between intermediate rollers 13 is varied. A sprocket 69 fixedly mounted on shaft 125 is coupled to a sprocket 71 fixedly mounted on shaft 23 by means of a chain 73. A second sprocket 75 fixedly mounted on shaft 23 drives a chain 77 which engages the lower portion of a sprocket 79 fixedly mounted on shaft 25 and meshes with a movable idler gear 81 and a fixed idler gear 83. Sprockets 75 and 79 are preferably of the same diameter and have the same number of teeth. It will be understood that chain 77 being so disposed as above described and as best illustrated in Fig. 1 drives the upper roller 11 mounted on shaft 23 in a direction opposite from the upper roller mounted on shaft 25. Idler gear 81 is rotatably mounted from a block 85 which is movable inwardly towards the center of the sheeting apparatus to tighten chain 77, or is movable outwardly to loosen the chain. It will be understood that such inward and outward movement may be necessary to accommodate chain 77 to the disposition of sprockets 75, 79 as the distance between the upper rollers 11 is varied.

An open top hopper 87 mounted on frame 8 is provided adjacent one of the upper rollers 11. Similarly, a second open top hopper 89 is provided adjacent the other of the upper rollers. Hoppers 87, 89 are adapted to receive flour and feed the flour by gravity onto the respective upper rollers 11. The surface of upper rollers 11 is preferably corrugated along the length thereof to provide grooves 91 which receive the flour fed from hoppers 87, 89 and work the flour into the dough as in kneading.

Means may be provided in hoppers 87, 89 to agitate the flour, thereby insuring proper flow of the flour from the hoppers. Such agitating means may comprise enlargements or vanes 93 fixedly mounted on transversely extending shafts 95 respectively journalled in the sides of hoppers 87, 89. Sprockets 97 are respectively fixedly mounted on shafts 95 and linked by means of chains 99 to sprockets 100 which are respectively fixedly mounted on shafts 23, 25. Thus, the rotation of shafts 23, 25 is effective to drive said agitating means by causing rotation of shafts 95.

From the foregoing it will be understood that a coordinated drive means is provided for concurrently driving the rollers 11, 13 and 15, and for driving the flour agitating means. While in Fig. 1 there is illustrated a certain specific ratio of roller speeds, which, as heretofore pointed out, is preferably such that the intermediate rollers 13 are driven at a speed substantially twice as fast as lower rollers 15 are driven at a speed substantially three times the speed of the intermediate rollers, it will be understood that it may be desirable to vary the ratios of the roller speeds which may be done as illustrated in Fig. 8 wherein sprockets of a different size from those illustrated in Fig. 1 have been substituted. Thus, a smaller sprocket 159 has been substituted for sprocket 59 and a larger sprocket 157 has been substituted for sprocket 57. Additionally, a smaller sprocket 163 has been substituted for sprocket 63. It will be understood, of course, that sprockets of a different size from those shown may be substituted to establish other speeds of rollers 11, 13 and 15.

Suitable means may be provided for feeding the dough into the upper set of rollers, and in the present invention such means is provided by a slanted tray 101 angled downwardly towards the opening between the upper pair of rollers 11 and provided with upstanding side walls 103 for preventing the dough from sliding from the tray 101.

In the operation of the apparatus, a slab of dough is placed on tray 101 and is fed between the upper set of rollers which compresses the dough as it is conveyed downwardly therebetween. The spacing between upper rollers 15 is preferably less than the thickness of the dough slab fed therein. It will be understood that flanges 21 will confine the dough into the space between the upper set of rollers which will cause the dough sheet to be compressed and lengthened as it passes between the rollers. The intermediate pair of rollers 13 are preferably spaced closer than the spacing between the upper pair of rollers 15, whereby the sheet of dough as it passes therebetween will be compressed. It will be understood that flanges 19 will confine the dough sheet in the space between the intermediate pair of rollers, whereby the dough sheet will be lengthened as it passes therebetween. The spacing between the lower pair of rollers 11 is preferably less than the spacing between the intermediate pair of rollers 13, whereby the sheet of dough as it passes therebetween will also be compressed. Similarly, it will be understood that flanges 17 will confine the sheet of dough between the lower set of rollers whereby the dough sheet will be lengthened as it passes therebetween. From the foregoing it will be understood that as the dough passes downwardly from one set of rollers to the next the length of the sheet of dough is increased, whereby the speed of the rollers must be successively increased. Generally, in the operation of the device the optimum spacing ratio of the rollers 11, 13, 15 are as above described, that is, the spacing between the upper rollers 15 is greater than the spacing between intermediate rollers 13, and the spacing between intermediate rollers 13 is greater than the spacing between the lower rollers 11, but it will be understood that this spacing may be varied to compensate for the various consistencies of dough and for the differences in materials used. Thus for example, if rubber is the material to be sheeted, a different spacing would be needed between the rollers than would be necessary with a material like dough.

It has been found that improved operation may be obtained by canting the sheeting apparatus, as by providing an inclined base 105 upon which frame 8 is mounted. By canting the apparatus, the tendency of the dough sheet to waver is thus eliminated.

From the foregoing it will be understood that improved means is provided for the sheeting of plastic material. In the apparatus of the present invention the plastic sheet is adapted to be compressed as it passes between the pairs of rollers without being pulled by the next underlying pair of rollers, thereby eliminating tears in the sheet. The unique arrangement of the roller sizes, speeds and spacing permits such non-tearing action which has heretofore not been possible in other types of sheeting apparatus. Additionally, a sheeting apparatus is provided having means for rapidly adjusting the spacing between the rollers whereby different consistencies of material may be accommodated.

We claim:

1. In a dough sheeting machine, a plurality of roller pairs including an upper pair, an intermediate pair and a lower pair, means supporting said upper pair with their axial centers on a plane inclined from the horizontal, said upper rollers being of substantially equal circumference and disposed with one roller elevated relative to the other, additional means respectively supporting said intermediate pair and said lower pair with the axial centers of each pair lying in planes respectively substantially parallel to said inclined plane, said intermediate rollers and said lower rollers being of substantially equal circumference less than the circumference of said upper rollers, the rollers of each said pair being spaced apart, the spaces between the roller pairs being disposed along a plane inclined from the vertical to define a substantially diagonally disposed dough passage, a bin overlying said elevated upper roller, said bin including a substantially vertical wall extending upwardly from said elevated upper roller and being positioned intermediate the axial center of said elevated roller and said passage, an elongated dough slab-receiving tray overlying the other of said upper rollers and extending outwardly a substantial distance beyond said other upper roller, said tray being inclined from the horizontal oppositely to the inclination of said inclined plane, disposed substantially in tangency to said other upper roller, and terminating at its inner end proximate to said passage and inwardly of the axial center of said other upper roller, means for driving said rollers at progressively increasing speeds downwardly along said passage for compressing the dough slab delivered along said tray to said passage into a sheet delivered from said lower rollers, the spacing between the successive pairs of rollers decreasing downwardly along said passage, and means for adjusting said spacings.

2. In a dough sheeting machine, a plurality of roller pairs including an upper pair, an intermediate pair and a lower pair, means supporting said upper pair with their axial centers on a plane inclined from the horizontal, said upper rollers being of substantially equal circumference and disposed with one roller elevated relative to the other, additional means respectively supporting said intermediate pair and said lower pair with the axial centers of each pair lying in planes respectively substantially parallel to said inclined plane, said intermediate rollers and said lower rollers being of substantially equal circumference less than the circumference of said upper rollers, the rollers of each said pair being spaced apart, the spaces between the roller pairs being disposed along a plane inclined from the vertical to define a substantially diagonally disposed dough passage, a bin overlying said elevated upper roller, said bin including a substantially vertical wall extending upwardly from said elevated upper roller and being positioned intermediate the axial center of said elevated roller and said passage, an elongated dough slab-receiving tray overlying the other of said upper rollers and extending outwardly a substantial distance beyond said other upper roller, said tray being inclined from the horizontal oppositely to the inclination of said inclined plane, disposed substantially in tangency to said other upper roller, and terminating at its inner end proximate to said passage and inwardly of the axial center of said other upper roller, means for driving said rollers at progressively increasing speeds downwardly along said passage for compressing the dough slab delivered along said tray to said passage into a sheet delivered from said lower rollers.

3. In a dough sheeting machine, a plurality of roller pairs including an upper pair, an intermediate pair and a lower pair, means supporting said upper pair with their axial centers on a plane inclined from the horizontal, said upper rollers being of substantially equal circumference and disposed with one roller elevated relative to the other, additional means respectively supporting said intermediate pair and said lower pair with the axial centers of each pair lying in planes respectively substantially parallel to said inclined plane, said intermediate rollers and said lower rollers being of substantially equal circumference less than the circumference of said upper rollers, the rollers of each said pair being spaced apart, the spaces between the roller pairs being disposed along a plane inclined from the vertical to define a substantially diagonally disposed dough passage, a bin overlying said elevated upper roller, said bin including a substantially vertical wall extending upwardly from said elevated upper roller and being positioned intermediate the axial center of said elevated roller and said passage, an elongated dough slab-receiving tray overlying the other of said upper rollers and extending outwardly a substantial distance beyond said other upper roller, said tray being inclined from the horizontal oppositely to the inclination of said inclined plane, disposed substantially in tangency to said other upper roller, and terminating at its inner end proximate to said passage and inwardly of the axial center of said other upper roller, means for driving said rollers for compressing the dough slab delivered along said tray to said passage into a sheet delivered from said lower rollers.

4. In a dough sheeting machine, a plurality of roller pairs including an upper pair, an intermediate pair and a lower pair, means supporting said upper pair with their axial centers on a plane inclined from the horizontal, said upper rollers being of substantially equal circumference and disposed with one roller elevated relative to the other, additional means respectively supporting said intermediate pair and said lower pair with the axial centers of each pair lying in planes respectively substantially parallel to said inclined plane, said intermediate rollers and said lower rollers being of substantially equal circumference less than the circumference of said upper rollers, the rollers of each said pair being spaced apart, the spaces between the roller pairs being disposed along a plane included from the vertical to define a substantially diagonally disposed dough passage, an elongated dough slab-receiving tray overlying the other of said upper rollers and extending outwardly a substantial distance beyond said other upper roller, said tray being inclined from the horizontal oppositely to the inclination of said inclined plane, disposed substantially in tangency to said other upper roller, and terminating at its inner end proximate to said passage and inwardly of the axial center of said other upper roller, means for driving said rollers for compressing the dough slab delivered along said tray to said passage into a sheet delivered from said lower rollers.

5. In a dough sheeting machine, a plurality of roller pairs including an upper pair, an intermediate pair and a lower pair, said upper rollers being of substantially equal circumference, said intermediate rollers and said lower rollers being of substantially equal circumference less than the circumference of said upper rollers, the rollers of each said pair being spaced apart, the spaces between the roller pairs being disposed to define a substantially downwardly extending dough passage, a bin overlying one of said upper rollers, said bin including a substantially vertical wall extending upwardly from said one upper roller and being positioned intermediate the axial center of said one roller and said passage, an elongated dough slab-receiving tray overlying the other of said upper rollers and extending outwardly a substantial distance beyond said other upper roller, said tray being inclined from the horizontal, disposed substantially in tangency to said other upper roller, and terminating at its inner end proximate to said passage and inwardly of the axial center of said other upper roller, means for driving said rollers at progressively increasing speeds downwardly along said passage for compressing the dough slab delivered along said tray to said passage into a sheet delivered from said lower rollers, the spacing between the successive pairs of rollers decreasing downwardly along said passage, and means for adjusting said spacings.

6. In a dough sheeting machine, a plurality of roller pairs including an upper pair, an intermediate pair and a lower pair, said upper rollers being of substantially equal circumference, said intermediate rollers and said lower rollers being of substantially equal circumference less than the circumference of said upper rollers, the rollers of each said pair being spaced apart, the spaces between the roller pairs being disposed to define a substantially downwardly extending dough passage, an elongated dough slab-receiving tray overlying the other of said upper rollers and extending outwardly a substantial distance beyond said other upper roller, said tray being inclined from the horizontal, disposed substantially in tangency to said other upper roller, and terminating at its inner end proximate to said passage and inwardly of the axial center of said other upper roller, means for driving said rollers from compressing the dough slab delivered along said tray to said passage into a sheet delivered from said lower rollers.

References Cited in the file of this patent

UNITED STATES PATENTS

| | | |
|---|---|---|
| 551,714 | Bromley | Dec. 17, 1895 |
| 1,700,303 | Bauer | Jan. 29, 1929 |
| 2,028,470 | Nordby | Jan. 21, 1936 |
| 2,149,927 | Pellar | Mar. 7, 1939 |
| 2,600,281 | Sticelber | June 10, 1952 |

FOREIGN PATENTS

| | | |
|---|---|---|
| 17,112 | Great Britain | Aug. 6, 1903 |
| 184,313 | Great Britain | Aug. 17, 1922 |
| 254,172 | Great Britain | July 1, 1926 |